W. J. CHASE.
END EXTENSION TO AUTOMOBILE WINDSHIELDS.
APPLICATION FILED SEPT. 15, 1919.
1,342,794.
Patented June 8, 1920.
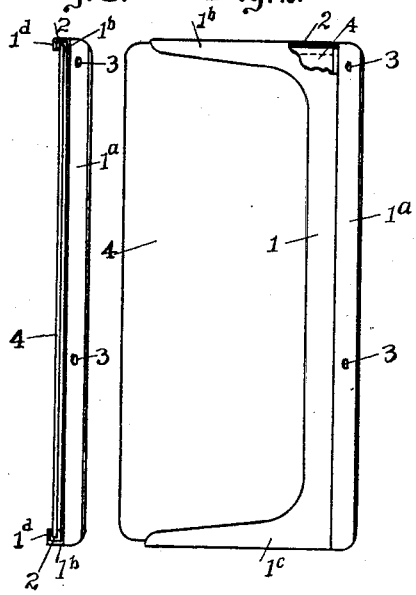
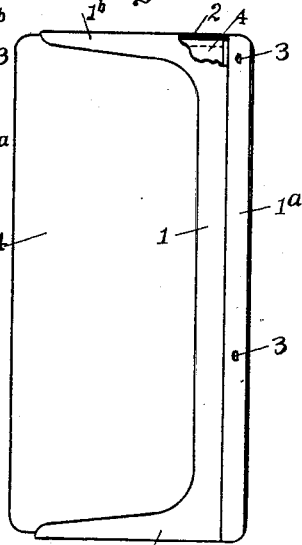
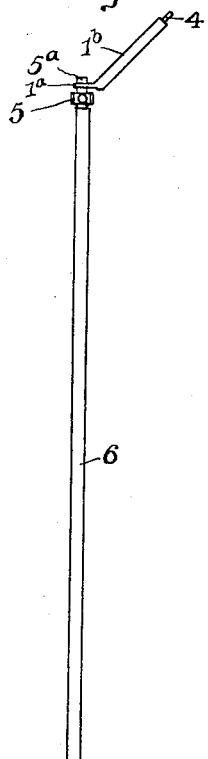
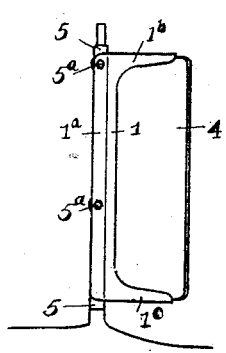
INVENTOR,
William J. Chase.
BY David E. Lain,
ATTORNEY.

UNITED STATES PATENT OFFICE.

WILLIAM J. CHASE, OF BELLINGHAM, WASHINGTON.

END EXTENSION TO AUTOMOBILE-WINDSHIELDS.

1,342,794.

Specification of Letters Patent. Patented June 8, 1920.

Application filed September 15, 1919. Serial No. 323,935.

*To all whom it may concern:*

Be it known that I, WILLIAM J. CHASE, a citizen of the United States, residing at Bellingham, in the county of Whatcom and State of Washington, have invented a new and useful End Extension to Automobile-Windshields, of which the following is a specification.

My invention relates to improvements in automobile windshields; and the object of my invention is to provide glazed end extensions to said windshields which will deflect the air laterally and be of such strong and durable structure as to suit them for durable and permanent parts of the windshield, and yet cause a minimum obstruction to a clear view.

I accomplish this object with the device illustrated in the accompanying sheet of drawing in which Figure 1 is a plan view of one of my windshield extensions, Fig. 2 is a side elevation of the same, Fig. 3 is an edge elevation of Fig. 2, Fig. 4 is a plan view, drawn on a smaller scale, of a windshield with my end extensions in place, and Fig. 5 is an end elevation of Fig. 4.

Similar characters refer to similar parts throughout. Certain parts are broken away in order to show others hidden thereby.

1 is a sheet metal frame comprising side rail 1, upper and lower rails $1^b$ and $1^c$, angle piece $1^a$, and channels $1^d$, $1^d$. This frame is preferably made of one piece cut and bent into the shape shown. 4 is a pane of plate glass of a size suited to glaze frame 1 and fit snugly in channels $1^d$, $1^d$ with folds of felt over the ends. The frame and glass are preferably so well fitted that the glass, when its ends are covered with the folds of felt, makes a very snug fit in channels $1^d$, $1^d$. In practice I have found this method of glazing the frame sufficient, but if desired, cement can be used in connection with the felt to make a fixed setting when the fitting has not been so exact. Holes 3, 3 are provided in angle piece $1^a$ which register with screws $5^a$, $5^a$ in standards 5, 5 of windshield 6. Said screws, which are a part of the windshield structure, are used to fasten my end extensions to the windshield as shown in Figs. 4 and 5. The inclination of angle piece $1^a$ is preferably such as to cause my extensions to extend outwardly and to the rear making an angle of about 45°. with the extended plane of the windshield.

The well-known form of windshield illustrated is well suited for the form of my extension shown, which is strong and simple. This I have used in practice with satisfaction. Also for several other types of windshields my extensions, as illustrated, are well suited for fastening thereto. But for some other types better fastening is made by using clamps fastened to the angle piece of my extension and clamped to the windshield standards. This method of fastening admits of adjustment of the angle which the extension makes with the windshield.

Having thus fully disclosed my invention, what I claim is new and desire to secure by Letters Patent is, In a vehicle windshield end extension in combination, a three-rail frame of a single metal sheet comprising upper, lower and front-side rails, said side rail having holes therethrough and extended forward and bent over on a longitudinal line and the outer edges of said end rails shaped into channels, and a pane of glass fitted to and retained in said channels.

WILLIAM J. CHASE.